Sept. 25, 1962     C. B. OLIVER     3,055,503
WATER PURIFYING APPARATUS
Filed Oct. 29, 1958     3 Sheets-Sheet 1
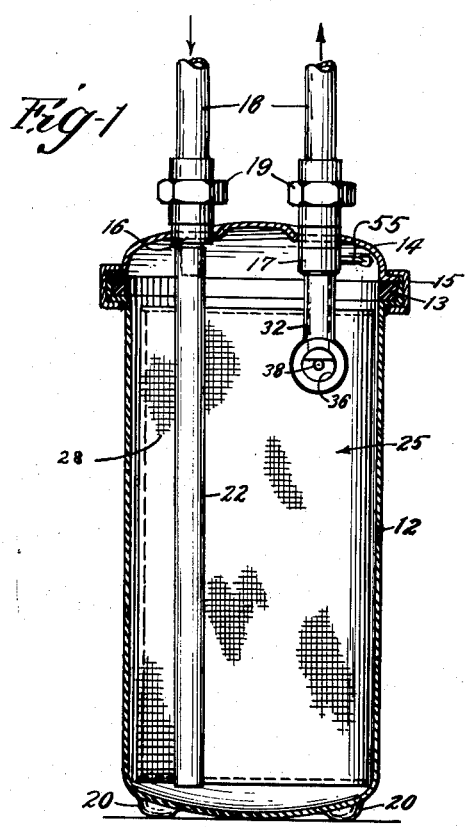
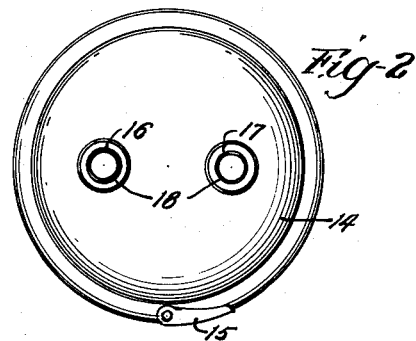
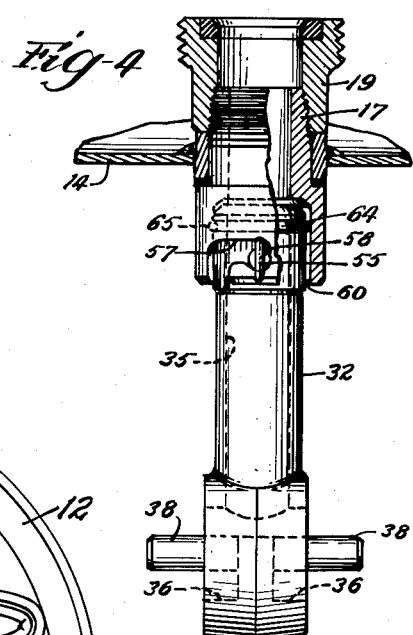
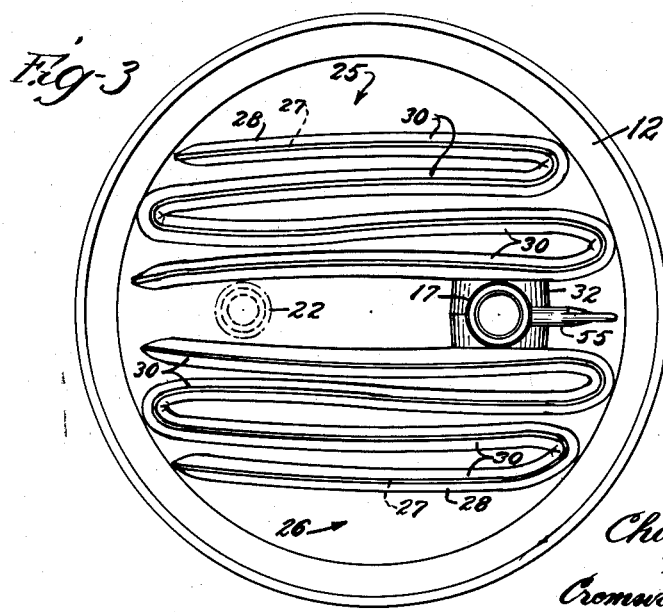
INVENTOR.
Chauncey B. Oliver
BY
Cromwell, Greist & Warden
Attys.

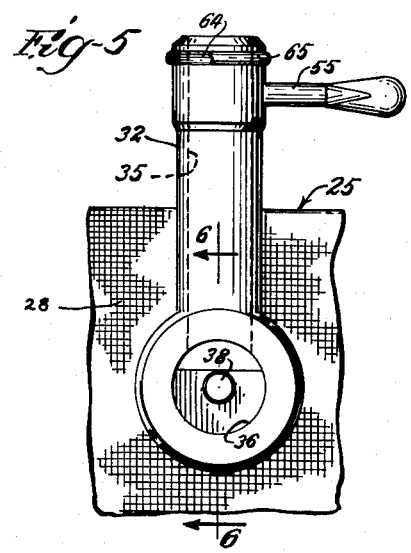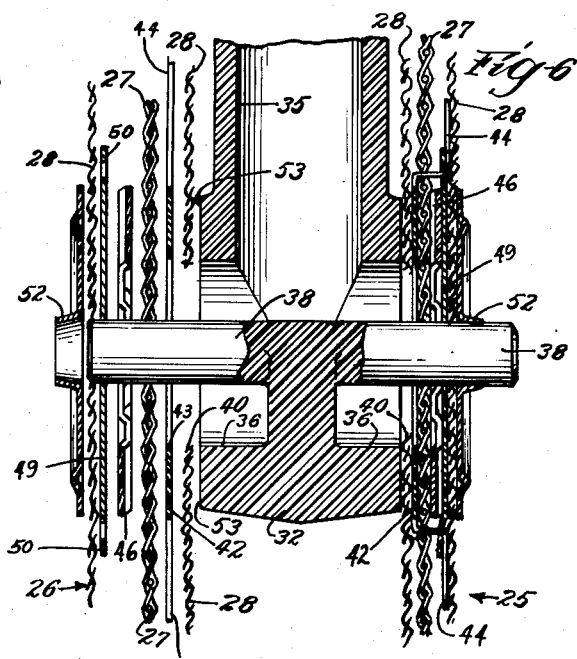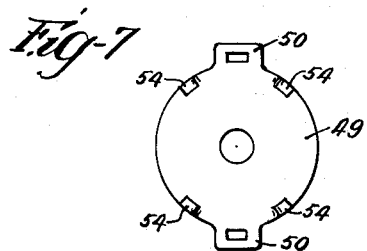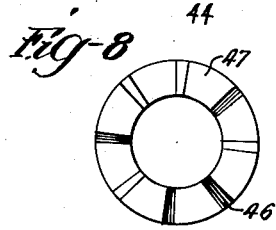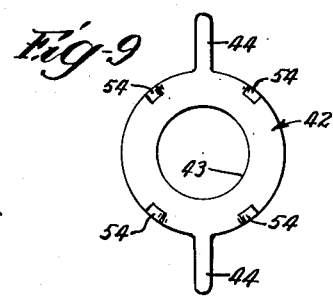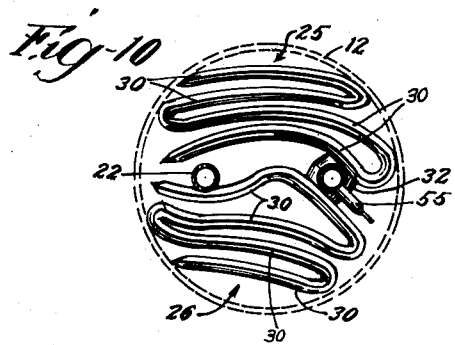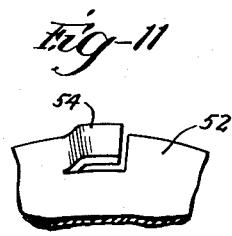

Sept. 25, 1962 C. B. OLIVER 3,055,503
WATER PURIFYING APPARATUS
Filed Oct. 29, 1958 3 Sheets-Sheet 3
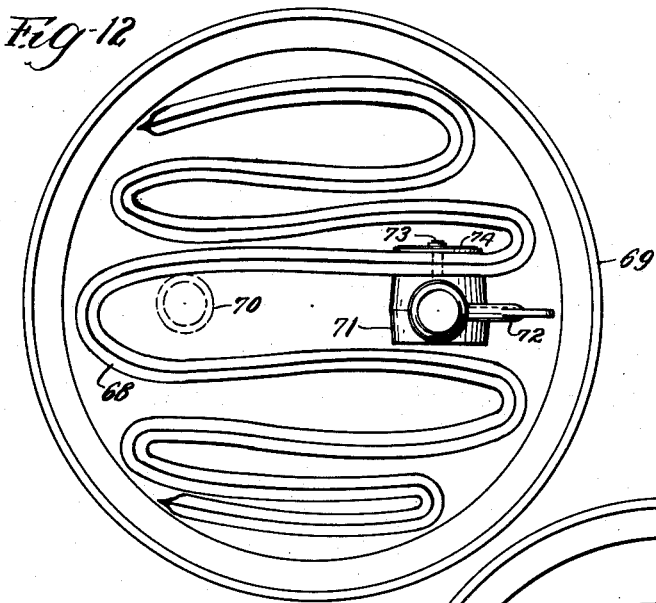
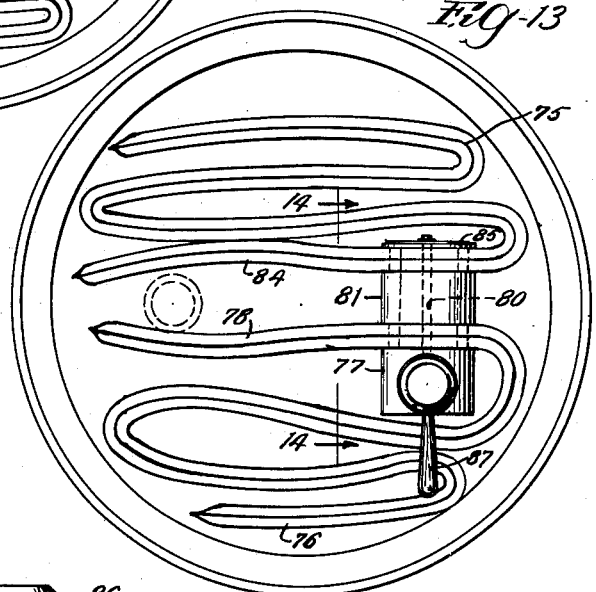
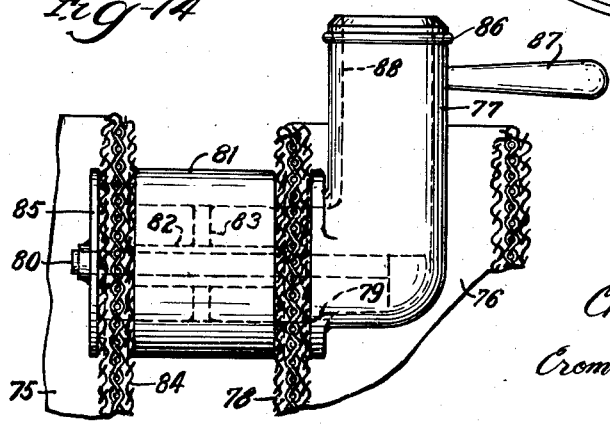
INVENTOR.
Chauncey B. Oliver
BY
Cromwell, Greist & Warden
Attys.

United States Patent Office 3,055,503
Patented Sept. 25, 1962

3,055,503
WATER PURIFYING APPARATUS
Chauncey B. Oliver, Blue Diamond, Nev., assignor to Everpure, Inc., Chicago, Ill., a corporation of Nevada
Filed Oct. 29, 1958, Ser. No. 770,555
3 Claims. (Cl. 210—238)

The present invention relates to filters and has particular reference to improvements and innovations in filters especially adapted for use in purifying water for drinking purposes, cooking, and the like. Filters of this general type are shown in U.S. Patents Nos. 2,081,353, 2,175,256 and 2,347,184.

This type of filter or water-purifying apparatus is of the type having a pressure shell, a removable cover therefor, inlet and outlet connectors disposed in the cover on opposite sides of the center thereof and spaced inwardly from the periphery thereof and adapted to be connected in a water distribution system, an inlet conduit extending downwardly from the inlet connector toward and adjacent to the bottom of the shell, and filter means in the shell through which the water must pass before being discharged from the outlet connector. To insure proper operation of such a filter it is necessary from time to time to replace the filter means. As this operation is generally undertaken by ordinary persons, it is necessary that the replaceable filter means be fabricated as sturdy and compact as possible and in a manner such that the replacement operation may be accomplished as simply as possible and in a minimum length of time.

An important object of the invention is to provide a new and improved filter apparatus of the character described wherein the filter means has an outlet fitting and wherein quick-connect, disconnect means are provided for connecting and disconnecting the outlet fitting to and from the inner end of the outlet connector.

Another important object of the invention is to provide a new and improved quick-connect, disconnect means for a pair of tubular members one of which is insertable in the other including a bayonet slot formed in the end of one, a transversely extending pin on the end of the other, and an extension of the pin of a length sufficient to constitute a finger-engageable handle suitable for facilitating locking the pin in the bayonet slot.

Another object of the invention is to provide in a filter apparatus of the character described a fluid-tight connection between an opening in the outlet fitting and the filter means including a pin projecting beyond the opening in the outlet fitting and through the filter means, and a friction washer pressed tightly against the outer surface of the filter means and having pin-gripping means associated with the central opening therein to prevent removal of the washer from the pin.

A still further object of the invention is to provide in a filter apparatus having an outlet connector, resiliently flexible filter means secured to an outlet fitting, and quick-connect means for assembling the outlet fitting to the outlet connector, means engageable with the resiliently flexible filter means when the outlet fitting is so assembled to the outlet connector serving to retain them in their assembled condition.

A more detailed object of the invention is to improve a filter apparatus of the type or class described by providing it with a T-shaped outlet fitting and a pair of tortuously bent filter elements each of which is fixedly and sealingly secured to one end of the transverse portion of the T-fitting, the T-fitting and the pair of filter elements secured thereto providing a compact, replacement filter unit for the apparatus.

Another detailed object of the invention is to provide a filter apparatus of the character described wherein the outlet fitting is L-shaped and wherein a pair of filter elements are sealingly connected thereto by a single friction pin and a single friction washer associated with the L-shaped fitting, a spacer member being provided on the pin between the pair of filter elements.

Certain other objects of the invention will, in part, be obvious, and will in part appear hereinafter. For a more complete understanding of the nature and scope of the invention reference may now be had to the accompanying drawings wherein:

FIG. 1 is a vertical sectional view taken through a water purifying apparatus embodying the features of the invention, certain parts being shown in elevation;

FIG. 2 is a top plan view of the water purifying apparatus shown in FIG. 1;

FIG. 3 is an enlarged plan view of the apparatus with the cover removed;

FIG. 4 is an enlarged, partially sectioned side elevational view of the outlet nipple and the associated T-fitting shown in FIG. 1;

FIG. 5 is an enlarged, front elevational view of the T-fitting shown in FIG. 1;

FIG. 6 is a fragmentary detail view on enlarged scale taken generally on the line 6—6 of FIG. 5 and showing one of two filter element connections tightly assembled to the right-hand end of the transverse portion of the T-fitting and showing the other filter element at the left-hand end of the transverse portion of the T-fitting in an exploded fashion;

FIG. 7 is a front elevational view of one of the washers shown in FIG. 6;

FIG. 8 is a front elevational view of a drainage washer shown in FIG. 6;

FIG. 9 is a front elevational view of another one of the washers shown in FIG. 6;

FIG. 10 is a plan view similar to FIG. 3 with the shell indicated in broken lines and showing the position of the T-fitting and the filter elements supported thereby when the pin is positioned in alignment with the open end of the bayonet slot as when assembling or disassembling the T-fitting to the outlet nipple;

FIG. 11 is an enlarged perspective view of a portion of the edge of one of the friction washers showing one of the punched-out projections;

FIG. 12 is a plan view similar to FIG. 3 showing a single filter element connected to an outlet fitting;

FIG. 13 is a plan view similar to FIGS. 3 and 12 showing a pair of filter elements connected to an L-shaped outlet fitting; and FIG. 14 is an enlarged, fragmentary vertical sectional view taken generally on the line 14—14 of FIG. 13.

It will be recognized that the improvements and innovations in the filter apparatus are of broader application, but for purposes of illustration and explanation, they will be described with reference to water purifiers of a type used for railroad cars, buses, boats, restaurants, etc. In the drawings, 12 designates a cylindrical pressure shell or container, 13 designates a ring-like sealing gasket, and 14 designates a cover or top for the shell 12. The shell 12 and the cover 14 are adapted to be tightly sealed together by means of a cylindrical clamp 15 of a known commercial type.

The cover 14 is provided with inlet and outlet connections in the form of an inlet nipple 16 and an outlet nipple 17, which extend through and are tightly secured in the cover. As shown in FIG. 2, the two nipples 16 and 17 are positioned in the cover 14 on opposite sides of the vertical axis of the pressure shell 12 and are spaced inwardly from the periphery of the cover a distance approximately equal to one-half the radius of the cover.

This water purifying apparatus is adapted to be connected to the pipes 18 of a water distribution system by means of standard union connectors 19 which are connected between the pipes 18 and the upper or outer ends of the nipples 16 and 17. The apparatus is adapted to either rest on a supporting surface on feet 20 formed on the bottom of the pressure shell 12 or to be suspended from overhead pipes of a water distribution system.

As best shown in FIGS. 1, 3 and 10, an elongated inlet conduit 22 is tightly fitted on the inner end of the inlet nipple 16 and extends vertically downwardly toward and adjacent to the bottom of the pressure shell 12 so as to provide for the admission of unfiltered water to the apparatus. The inlet conduit 22 may be formed of plastic or any other suitable material.

To purify and filter the water passing through this apparatus, a pair of filter elements, indicated generally by reference numerals 25 and 26, are provided in the pressure shell 12. Each of these filter elements is normally disposed in the pressure shell on opposite sides of a vertical plane extending through the vertical axis of the shell 12 and through the axes of the inlet and outlet nipples 16 and 17. Each of the filter elements includes a porous or foraminous, substantially rigid but bendable, inner supporting member 27, such as a wire mesh screen, which is enclosed between two pieces of suitable filter cloth 28, the edges of which extend beyond the edges of the supporting member 27 and are tightly sealed together.

The filter cloth 28 preferably is secured about the supporting member 27 while the latter is in a substantially flat form. After the edges of the filter cloth have been sealed, the filter elements 25 and 26 are folded over on themselves a number of times, as shown in FIG. 3. By forming each filter element in this manner, a large surface of filter area is housed within a relatively small space. In the particular embodiment shown in FIG. 3, each filter element is provided with three reverse bends and four generally parallel runs or pleats 30. It will be understood that the particular shape imparted to each filter element is immaterial as long as the surface area presented for formation of the charge in the output of the filter is large. The spaces between the adjacent pleats 30 of the tortuously bent filter elements are desirably made such that the layers of deposited charge of filter particles on adjacent pleats will not touch or interfere with each other.

The inner pleat 30 of each of the filter elements 25 and 26 is sealingly connected to and thereby supported from a hollow outlet fitting 32 which is releasably connected to the inner end of the outlet nipple 17. It is noted that the pair of filter elements 25 and 26 could be replaced by a single filter element having a length approximately twice the length of either one of the filter elements 25 and 26, as shown in FIG. 12. The outlet fitting may be formed of any suitable material, including metals or plastics, and of any desired shape for a particular installation. In the preferred embodiment of the invention shown in FIGS. 1 to 11 inclusive, the outlet fitting is T-shaped and formed of plastic. More particularly, the outlet fitting 32, as best shown in FIGS. 4, 5 and 6, is formed or molded of plastic (e.g. nylon) and has the general shape of an inverted T with the upper end of the vertical leg portion thereof being connectable to the outlet nipple 17 and with the two filter elements 25 and 26 being secured against the opposite ends of the transverse portion of the T-fitting 32 which is in the form of a thick disk. As most clearly indicated in FIG. 6, the vertical leg portion of the T-fitting 32 is provided with an internal bore 35 which extends downwardly from the upper end thereof into communication with a pair of horizontally disposed bores 36 in the transverse portion of the T-fitting 32 which are open at the outer ends of the transverse portion. The T-fitting 32 is further provided with a pair of integral friction pins 38 each of which extends axially through one of the bores 36 and projects somewhat beyond the outer end of the transverse portion for a purpose to be explained.

In fabricating each of the filter elements 25 and 26, a circular outlet opening 40 (FIG. 6) is formed near the top of the outer filter cloth 28 of the innermost pleat 30, the opening 40 being substantially the same diameter as the bore 36. Additionally, a series of washers of known type are secured to each supporting member 27 adjacent the outlet opening 40. As best shown in FIGS. 6 through 9, each series or set of washers includes a washer 42 (FIG. 9) having a relatively large central opening 43 and a pair of elongated fingers or tabs 44 extending therefrom and which is disposed against the supporting member 27 on the side thereof adjacent to the outlet opening 40, a drainage washer 46 (FIG. 8) having a series of drainage channels 47 and which is disposed on the opposite side of the supporting member 27, and a washer 49 (FIG. 7) having a pair of slotted ears 50 and which is disposed adjacent the drainage washer 46. The elongated tabs 44 of the washer 42 are bent and passed through the supporting member 27 and through the slotted ears 50 of the washer 49 so as to rigidly secure the series of washers to the supporting member 27 adjacent the outlet opening 40 formed in the outer filter cloth.

In assembling or securing each of the filter elements 25 and 26 to the outlet fitting 32, the outlet opening 40 is placed against the open end of the transverse portion of the T-fitting 32 with the friction pin 38 extending through the opening 40, the washer 42, the supporting member 27, the drainage washer 46, the washer 49 and through a small opening in the other filter cloth, as best shown in the left-hand portion of FIG. 6. Then, a friction washer 52 is press-fitted on the outer end of the friction pin 38 so as to tightly secure each of the filter elements to one end of the transverse portion of the T-fitting 32, as shown in the right-hand portion of FIG. 6. As shown in FIG. 6, the opening in each friction washer 52 is provided with a neck portion which diverges inwardly and away from the main body portion thereof. The neck portions frictionally grip the pins 38 and tightly secure the filter elements 25 and 26 to the T-fitting 32, the divergence of the neck portions preventing the friction washers 52 from backing off of the pins 38.

It has been found to be good practice to initially assemble the parts and then to press both of the friction washers 52 onto the friction pins 38 simultaneously, using a jig if desirable. It is noted that the outer ends 53 (FIG. 6) of the transverse portion of the T-fitting 32 may desirably be roughened to increase the frictional engagement with the filter cloth and that the washers 42 and 49 and the friction washers 52 may have partially punched out projections 54 for frictionally engaging the filter cloths, thus tending to prevent relative movement between the filter elements 25 and 26 and the outlet fitting 32. One of these projections 54 is shown more fully in FIG. 11, a fragmentary perspective view of one of the friction washers 52. With this arrangement, water passing out of the apparatus through the outlet fitting 32 must of necessity have first passed through one of the filter elements 25 or 26.

Inasmuch as the filter elements 25 and 26 of the character described herein have to be replaced from time to time along with the outlet fitting 32 to which they are fixedly secured, novel means are provided for easily connecting the upper end of the T-fitting 32 to the inner end of the outlet nipple 17, in the form of a pin-and-bayonet-slot typ connection.

As noted in FIG. 5, a laterally projecting pin 55 including a finger manipulating portion at its outer end is formed integrally with and adjacent to the upper end of the vertical leg portion of the T-fitting 32 so that it extends at right angles to the friction pins 38. The inner end of the outlet nipple 17 is provided with one bayonet slot 57 (FIG. 4) which is disposed on the portion of the nipple 17 nearest the periphery of the cover 14. It is of particular importance that the locking end 58 of the slot 57 is disposed in the vertical plane extending through the axes of the shell 12 and the inlet and outlet nipples 16 and 17, with the open or entrance end of the slot being displaced from or positioned to one side of this vertical plane. This arrangement insures that the pin 55 will normally be held in the locking end 58 of the slot 57 when the apparatus is assembled for use, as will now be explained.

In replacing the filter elements in this apparatus, the clamp 15 is loosened and the cylindrical shell 12 is removed from sealed engagement with the stop 14 which may remain connected in a water distribution system. The old filter elements are disconnected by manually rotating the pin 55 into alignment with the open or entrance end of the slot 57 and removing the upper end of the T-fitting 32 from the nipple 17. After the old filter elements have ben removed, the new elements and the T-fitting to which they are secured are assembled to the device. First, the new filter elements 25 and 26 are positioned below the cover 14 with the inlet conduit 22 extending downwardly between the two filter elements and with the vertical leg portion of the T-fitting 32 disposed below the inlet nipple 17. To fully insert the upper end of the vertical leg portion into a bore 60 (FIG. 4) of the outlet nipple 17, it is necessary to manually rotate, using the finger pin 55 for torque or leverage, the outlet fitting 32 until the pin 55 is aligned with the open end of the slot 57. As is evident in FIG. 10, this action tends to force one end of the inner pleat 30 of the filter element 26 against the inlet conduit 22 and somewhat deforms the relatively springy inner pleat from its normal planar position. Thus, when the pin 55 has been inserted in the open end of the slot 57 and released, there is a tendency for the deformed inner pleat 30, due to its somewhat resilient contact with the inlet conduit 22, to cause rotation of the outlet fittting 32 until the pin 55 is disposed in the locking end 58 of the slot 57, in which position the two inner pleats 30 of the filter elements 25 and 26 extend generally parallel to the vertical plane extending through the axes of the shell 12 and the inlet and outlet nipples 16 and 17 and along opposite sides of the inlet conduit 22. This arrangement thus tends to normally retain the pin 55 of the T-fitting 32 in its locked position. When it is necessary to remove the filters, it is again necessary to use some degree of manual force to shift the pin 55 into alignment with the open or entrance end of the slot 57.

The new filter elements may come enclosed in a protective covering, such as a plastic bag, which, to prevent contamination, is not removed until after the outlet fitting 32 has been connected to the outlet nipple 17 and just before the shell 12 is again assembled to the cover 14.

It may appear somewhat unusual to utilize a pin-and-bayonet-slot type lock for a connection that of necessity must be fluid tight even under considerable pressure. To insure that the connection between the T-fitting 32 and the outlet nipple 17 is fluid tight, an annular groove 64 is formed on the vertical leg portion of the T-fitting 32 adjacent the upper end thereof. An O-ring 65 of known type is disposed in the groove 64 and acts to insure a fluid tight seal with the bore 60 of the outlet nipple 17. Preferably, the upper end of the bore 60 in the outlet nipple 17 may be tapered inwardly slightly to provide an easier and more effective sealing contact with the O-ring 65.

It is to be understood that the invention is not to be limited to a single pin-and-bayonet-slot type lock inasmuch as a double pin-and-bayonet-slot type lock, for instance, would be just as effective.

Before the filter apparatus is completely assembled, a quantity of finely divided filter charge is placed in the pressure shell 12. The nature and quantity of the charge will depend upon such factors as the length of time the filter is to be used before cleaning and recharging, the closeness of adjacent surfaces of the filter elements, and the characteristics of the water to be purified. Combinations of various filtering materials may be employed as the charge, or various materials may be used alone, as will be well understood by one skilled in the art. A charge which has been found to be particularly desirable in the purification of water for drinking purposes employs finely divided particles of activated carbon as the principal element of the charge.

In operation, the inlet and outlet nipples 16 and 17 are connected by means of the standard unions 19 in a suitable water supply system and water is introduced into the shell 12 under pressure. Due to the agitation produced in the water as it enters the shell 12, the finely divided charge is agitated from the bottom of the shell and dispersed in the water as it rises in the shell. The water then passes through the filter elements and into the outlet fitting 32. Passage of the water through the filter cloth causes the suspended particles of the charge to be hydrostatically desposited thereon, thereby forming a continuous uniform layer which covers the filter cloth. Thereafter, the water must pass through the layer of the charge before passing through the filter cloth. Due to this arrangement, the impurities of the water are retained on the charge rather than on the filter cloth itself. There is thus provided a water purifying apparatus having a large effective filter area covered with a uniform layer of a hydrostatically deposited charge which removes color, taste, and odor-forming bodies, as well as suspended solids, from the water.

The filter cloth 28 employed in fabricating the filter elements 25 and 26 is preferably sufficiently porous to permit a free flow therethrough and sufficiently retentive to prevent passage therethrough of solid particles of the charge. By sealing the edges of the filter cloth, particles of the charge and unfiltered water are prevented from passing between adjacent edges thereof.

In the modification of the apparatus shown in FIG. 12, a single filter element 68, which is similar in construction to the filter elements 25 and 26 of the embodiment of FIGS. 1 to 11 inclusive but approximately twice the length thereof, is disposed in a pressure shell 69 having an inlet conduit indicated at 70. The filter element 68 is sealingly connected to and supported from an outlet fitting 71 which is adapted to be releasably connected to an outlet nipple (not shown) by pin-and-slot means in the same manner as the outlet fitting 32 of the embodiment of FIGS. 1 to 11 inclusive is connected to the outlet nipple 17. As in the embodiment of FIGS. 1 to 11 inclusive, the pin of the pin-and-slot means is of a length to define a finger-engageable handle 72. In this modification, the outlet fitting 71 differs from the outlet fitting 32 in that one end of the transverse portion is not provided with an opening such as opening 36 but rather is closed off so that only the end of the transverse portion to which the filter element 68 is connected is provided with an opening and an integral pin 73 comparable to the opening 36 and pin 38 of the outlet fitting 32. The connection between the filter element 68 and the outlet fitting 71 of the modification of FIG. 12 is identical, including the previously described drainage washers and a friction washer 74 tightly fitted on the pin 73, to the connection of either one of the filter elements 25 or 26 to the outlet fitting 32 of the embodiment of FIGS. 1 to 11 inclusive.

The embodiment of the invention shown in FIGS. 13 and 14 utilizes a pair of filter elements 75 and 76 identical to the filter elements 25 and 26 of the embodiment of FIGS. 1 to 11 inclusive and an L-shaped outlet fitting 77. As best shown in FIG. 14, the inner pleat 78 of the filter element 76 is disposed against an opening 79 formed in the end of the transverse portion of the L-shaped fitting 77 and is supported on an elongated pin 80 extending axially through the opening 79 in a horizontal direction by means of drainage washers substantially identical to those disclosed in the embodiment of FIGS. 1 to 11 inclusive. A cylindrical spacer 81 having a sleeve 82 adapted to fit on the pin 80 is fitted on the pin 80 against the pleat 78 of the filter element 76. The sleeve 82 is supported axially in the spacer 81 by a spider 83 so as to define fluid passage means through the spacer 81. The inner pleat 84 of the filter element 75 is supported on the pin 80 against an open end of the spacer 81 by means of drainage washers of the type previously disclosed herein and a friction washer 85 is tightly fitted on the end of the pin 80 against the pleat 84 of the filter element 75. With this arrangement, the two filter elements 75 and 76 are connected in sealing and supporting engagement to the L-shaped outlet fitting 77.

The upper end of the L-shaped outlet fitting 77 is provided with a sealing ring 86 and a finger-engageable pin 87 adapted to be interconnected with a mating bayonet slot formed in an outlet nipple (not shown) whereby the L-shaped outlet fitting 77 may be releasably connected to its associated outlet nipple in the same manner as the T-shaped outlet fitting 32 of the embodiment of FIGS. 1 to 11 inclusive is connected to its outlet nipple 17. A bore 88 extends through the L-shaped outlet fitting 77 to define a fluid passage between the opening 79 in the end of the transverse portion of the fitting 77 and the open upper end of the vertical portion thereof.

Although the embodiments of the invention shown and described herein utilize a preferred form of quick-connect, disconnect means between the outlet fitting and the outlet connector, it is to be understood that other quick-connect, disconnect means could be used, such as a sliding joint type of connection. Additionally, while the flexible, reversible bent filter elements shown in the drawings are preferred, it will be appreciated that other forms of filter elements may be used, such as a plurality of oval or circular elements separated by spacers and secured to an outlet fitting in accordance with the invention, such elements adapted to be supported either vertically or horizontally within the pressure shell.

It will be understood that the foregoing and certain further changes may be made in the construction and arrangement of the improved water purifying apparatus disclosed herein without departing from the spirit and scope of the invention as defined in the appended claims.

I claim:

1. In combination with a liquid-purifying apparatus characterized by a pressure shell having inlet and outlet connectors extending through the top thereof, the improvement which comprises, at least one filter element in the pressure shell, an outlet fitting permanently secured at its lower end to the upper portion of said filter element and having an open upper end projecting above the upper edge of said filter element and releasably connected in fluid-tight relationship to the inner end of the outlet connector, quick connect-disconnect means in the form of a pin-and-bayonet slot connection formed in part on the upper end of said outlet fitting above the upper edge of said filter element and in part on the inner end of said outlet connector for quickly rotatably connecting and disconnecting said upper end of said outlet fitting to and from the inner end of said outlet connector with the relative rotation between said fitting and said connector being limited to less than 90°, an inlet conduit connected to the inner end of said inlet connector and extending downwardly through said pressure shell, said filter element comprising a reversely folded construction extending on either side of said inlet conduit, whereby said inlet conduit is engageable by said filter element on slight rotation of said outlet fitting with respect to said outlet connector and sealing means associated with said quick connect-disconnect means for providing said fluid-tight relationship therefor, said pin of said connection being provided on said upper end of said outlet fitting above the upper edge of said filter element and being sufficiently long to constitute a manually grippable handle whereby to permit removal of a used filter element for cleaning or for replacement by a new clean filter element without the necessity of handling and possibly contaminating the filter element during connection of the outlet fitting secured to the upper portion thereof to the outlet connector.

2. In combination with a water-purifying apparatus having a pressure shell, a top therefor including inlet and outlet nipples extending therethrough and spaced on opposite sides of its center and inwardly of its periphery, and an inlet conduit extending downwardly from the inner end of the inlet nipple toward and adjacent to the bottom of the shell, the improvement which comprises, filter element means in the pressure shell, an outlet fitting having an open lower end sealingly secured by a permanent connection to the upper portion of said filter element means, an open upper end of said outlet fitting projecting above the upper edge of said filter element means and being inserted into the inner end of the outlet nipple, means defining a bayonet slot in the inner end of the outlet nipple, an integral transversely extending pin provided on the upper end of said outlet fitting above the upper edge of said filter element means, said pin being engageable in said bayonet slot whereby to connect said outlet fitting to said outlet nipple, said outlet fitting and permanently attached filter element means thereby being suspended from said outlet nipple which extends through the top of the pressure shell, said transversely extending pin having a length sufficient to permit connecting and disconnecting said outlet fitting and attached filter element means to and from said outlet nipple solely by manual gripping and manipulation of said pin whereby to eliminate the necessity of handling and possibly contaminating said filter element means, and a sealing ring disposed in an external annular groove formed on the upper end of said outlet fitting, said ring being sealingly engaged in said outlet nipple when said pin is disposed in the locking end of said bayonet slot, said filter element means comprising a reversely folded construction extending on either side of said inlet conduit, whereby said inlet conduit is engageable by said filter element means on slight rotation of said outlet fitting with respect to said outlet connector.

3. In combination with a liquid-purifying apparatus characterized by an open-topped pressure shell, and by a closure therefor having inlet and outlet nipples extending therethrough and spaced on opposite sides of its center and inwardly of its periphery, the improvement which comprises, a pair of pleated filter elements each of which includes a foraminous supporting and separating member sealed within a filter cloth covering, a hollow inverted T-fitting, means sealingly connecting corresponding upper portions of said pair of filter elements permanently to opposite open ends of the transverse portion of said T-fitting whereby said filter elements are suspended therefrom with the open upper end of said T-fitting projecting above the upper edges of said pair of filter elements, means defining a bayonet slot in the inner end of the outlet nipple, a manually grippable connector pin projecting transversely from the upper end of the vertical portion of said T-fitting above the upper edges of said pair of filter elements, said pin being engageable in said bayonet slot to connect said T-fitting to said outlet nipple whereby said T-fitting and said pair of filter elements attached thereto are suspended from said outlet nipple secured in the top of the pressure shell, said pin-and-slot arrangement being adapted to permit said T-fitting to be rotatably connected to and disconnected from said outlet nipple with a relative rotation therebetween of less than 90° with said manually grippable pin eliminating the necessity of handling and possibly contaminating said filter elements, a sealing ring disposed in an external annular groove formed on the upper end of the vertical portion of said T-fitting for fluid-tight sealing engagement in said outlet nipple when said pin is disposed in the locking end of said bayonet slot, and an inlet conduit extending downwardly from the inner end of the inlet nipple between said pair of filter elements and in contacting engagement therewith, said pair of filter elements being of reversely folded construction and extending one on either side of said inlet conduit, whereby said inlet conduit is engageable by said filter elements on slight rotation of said T-fitting with respect to said outlet nipple.

References Cited in the file of this patent

UNITED STATES PATENTS

| | | |
|---|---|---|
| 705,571 | Ferguson | July 29, 1902 |
| 1,520,654 | Johnson | Dec. 23, 1924 |
| 1,705,042 | Babitch | Mar. 12, 1929 |
| 2,047,714 | Smith | July 14, 1936 |
| 2,081,353 | Dick | May 25, 1937 |
| 2,175,256 | Dick | Oct. 10, 1939 |
| 2,315,981 | Olson | Apr. 6, 1943 |
| 2,347,184 | Dick et al. | Apr. 25, 1944 |
| 2,505,915 | Salmi | May 2, 1950 |
| 2,616,733 | Strange | Nov. 4, 1952 |
| 2,680,521 | Kamrath | June 8, 1954 |
| 2,709,525 | Beyer et al. | May 31, 1955 |
| 2,771,156 | Kasten et al. | Nov. 20, 1956 |
| 2,799,202 | Patten | July 16, 1957 |
| 2,803,079 | Heilman | Aug. 20, 1957 |
| 2,833,569 | Budnick | May 6, 1958 |